United States Patent
Yoshikawa et al.

(10) Patent No.: US 12,454,261 B2
(45) Date of Patent: Oct. 28, 2025

(54) RAPID ACCELERATION SUPPRESSION DEVICE AND RAPID ACCELERATION SUPPRESSION CONTROL METHOD

(71) Applicant: HONDA MOTOR CO., LTD., Tokyo (JP)

(72) Inventors: Fumiaki Yoshikawa, Tokyo (JP); Hisanori Yanagida, Tokyo (JP); Satoshi Matsushita, Tokyo (JP); Takashi Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 18/188,722

(22) Filed: Mar. 23, 2023

(65) Prior Publication Data

US 2023/0322211 A1    Oct. 12, 2023

(30) Foreign Application Priority Data

Mar. 28, 2022   (JP) .................................. 2022-051827

(51) Int. Cl.
*B60W 30/08*    (2012.01)
*B60W 10/04*    (2006.01)
*B60W 50/14*    (2020.01)

(52) U.S. Cl.
CPC ............ *B60W 30/08* (2013.01); *B60W 10/04* (2013.01); *B60W 50/14* (2013.01);
(Continued)

(58) Field of Classification Search
CPC .... B60K 20/02; B60K 26/02; B60K 31/0008; B60K 2031/0016; B60W 10/04;
(Continued)

(56) References Cited

U.S. PATENT DOCUMENTS

2016/0236687 A1    8/2016   Kuroba
2017/0226947 A1    8/2017   Kawakami et al.
(Continued)

FOREIGN PATENT DOCUMENTS

CN    105882657 A    8/2016
CN    106042924 A    10/2016
(Continued)

OTHER PUBLICATIONS

Japanese Office Action received in corresponding Japanese application No. 2022-051827 dated Oct. 24, 2023 with English tanslation (10 pages).
(Continued)

*Primary Examiner* — Atul Trivedi
(74) *Attorney, Agent, or Firm* — Rankin, Hill & Clark LLP

(57) ABSTRACT

A rapid acceleration suppression device of a vehicle includes: a shift position acquisition part configured to acquire an operation position of a gearshift; an accelerator position acquisition part configured to acquire a depression amount of an accelerator pedal; an accelerator operation determination part configured to determine an operating state of the accelerator pedal; and an acceleration suppression control part configured to provide control over a vehicle drive part, (i) such that acceleration of the vehicle is suppressed, when the position of the gearshift is in a non-drive range and also when the accelerator operation determination part determines that a sudden depression of the accelerator pedal, and (ii) such that the vehicle travels at a low speed, and then, at an accelerated speed within a prescribed upper limit, when the position of the gearshift is changed from the non-drive to drive range, while the accelerator pedal is kept on being depressed.

12 Claims, 5 Drawing Sheets

(52) U.S. Cl.
CPC ..... *B60W 2510/10* (2013.01); *B60W 2540/10* (2013.01); *B60W 2554/80* (2020.02)

(58) Field of Classification Search
CPC ................ B60W 30/08; B60W 30/09; B60W 30/18027; B60W 50/087; B60W 50/14; B60W 2510/10; B60W 2510/1005; B60W 2510/101; B60W 2520/10; B60W 2540/10; B60W 2540/106; B60W 2540/16; B60W 2554/80; B60W 2720/106; B60W 2050/143; F02D 29/02; F02D 2200/602
USPC .......................................................... 701/99
See application file for complete search history.

(56) References Cited

U.S. PATENT DOCUMENTS

| | | | |
|---|---|---|---|
| 2019/0202460 A1 | 7/2019 | Ishikawa et al. | |
| 2021/0039665 A1 | 2/2021 | Kaminade et al. | |
| 2021/0309240 A1* | 10/2021 | Kim ...................... | B60W 50/10 |
| 2023/0303071 A1* | 9/2023 | Kobayashi ............ | B60W 30/09 |

FOREIGN PATENT DOCUMENTS

| | | | | |
|---|---|---|---|---|
| CN | 110001616 A | | 7/2019 | |
| CN | 110203201 A | | 9/2019 | |
| CN | 110884479 A | * | 3/2020 | ........ B60W 50/0098 |
| CN | 112339559 A | | 2/2021 | |
| CN | 116494759 A | * | 7/2023 | ............. B60K 28/14 |
| CN | 116811574 A | * | 9/2023 | ............. B60W 30/08 |
| CN | 119611350 A | * | 3/2025 | ............. B60W 50/14 |
| JP | 2002-256920 A | | 9/2002 | |
| JP | 2014-227877 A | | 12/2014 | |
| JP | 2016-042882 A1 | | 4/2017 | |
| JP | 2021-032101 A | | 3/2021 | |
| KR | 20200058642 A | * | 5/2020 | ........ B60R 21/0134 |
| KR | 20210031167 A | * | 3/2021 | ........ B60R 16/0232 |
| WO | WO-2018141077 A1 | * | 8/2018 | ............. B60K 26/02 |
| WO | WO-2020201961 A1 | * | 10/2020 | ........ B60W 60/0013 |

OTHER PUBLICATIONS

Chinese Office Action received in corresponding Chinese application No. 202310087513.X dated Mar. 31, 2025 with English translation (15 pages).

* cited by examiner

RAPID ACCELERATION SUPPRESSION DEVICE AND RAPID ACCELERATION SUPPRESSION CONTROL METHOD

CROSS REFERENCE TO RELATED APPLICATIONS

This application claims the benefit of Japanese Patent Application No. 2022-051827 filed on Mar. 28, 2022, the disclosure of which is incorporated herein by reference.

BACKGROUND OF THE INVENTION

1. Field of the Invention

The present invention relates to a rapid acceleration suppression device and a rapid acceleration suppression control method.

2. Description of the Related Art

A rapid acceleration suppression system of a vehicle has been known which is used when a driver intending to apply a brake pedal mistakenly presses an accelerator pedal instead. When the erroneous press of the accelerator pedal is detected, the system notifies the driver of whether or not there is an obstacle around the vehicle and prompts the driver for an appropriate handling of the vehicle using a display on a screen or the like. The system also allows an input of an accelerator position by lowering compared with an actually inputted one, to thereby suppress a sudden start or a rapid acceleration.

Japanese Laid-Open Patent Application, Publication No. 2021-032101 (which may also be referred to as Patent Document 1) discloses, for example, when a shift position of a vehicle is changed from a non-drive range to a drive range while an accelerator pedal is kept on being pressed down, an accelerator position signal lower than that corresponding to an actual accelerator position is outputted to an engine control unit, to thereby prevent a sudden start of the vehicle.

[Patent Document 1] Japanese Laid-Open Patent Application, Publication No. 2021-032101

SUMMARY OF THE INVENTION

In the above-described conventional technology, however, acceleration suppression in shifting from the non-drive range to the drive range may leave the driver stranded in an intersection or the like, even when he/she desires to start the vehicle.

In light of the above-described conditions, the present invention has been made in an attempt to provide a rapid acceleration suppression device and a rapid acceleration suppression control method, each of which can prevent a smooth flow of traffic from being blocked while improving safety of the traffic.

In order to solve the above-described problem, a rapid acceleration suppression device of the present invention that suppresses a rapid acceleration of a vehicle includes: a shift position acquisition part configured to acquire an operation position of a gearshift; an accelerator position acquisition part configured to acquire a depression amount of an accelerator pedal as an accelerator position; an accelerator operation determination part configured to determine an operating state of the accelerator pedal, based on a level and a temporal change of the accelerator position; and an acceleration suppression control part configured to provide control over a vehicle drive part, (i) such that acceleration of the subject vehicle is suppressed, when the position of the gearshift acquired by the shift position acquisition part is in a non-drive range and also when the accelerator operation determination part determines that the accelerator pedal has been suddenly depressed, and (ii) such that the vehicle travels at a low speed at first, and then, at an accelerated speed within a prescribed upper speed limit, when the position of the gearshift is changed from the non-drive range to a drive range, while the accelerator pedal is kept on being depressed.

The rapid acceleration suppression device and the rapid acceleration suppression control method of the present invention can each prevent a smooth flow of traffic from being blocked while improving safety of the traffic.

DETAILED DESCRIPTION OF THE EMBODIMENTS

A rapid acceleration suppression device according to an embodiment of the present invention is described below with reference to related drawings.

Figure 1:
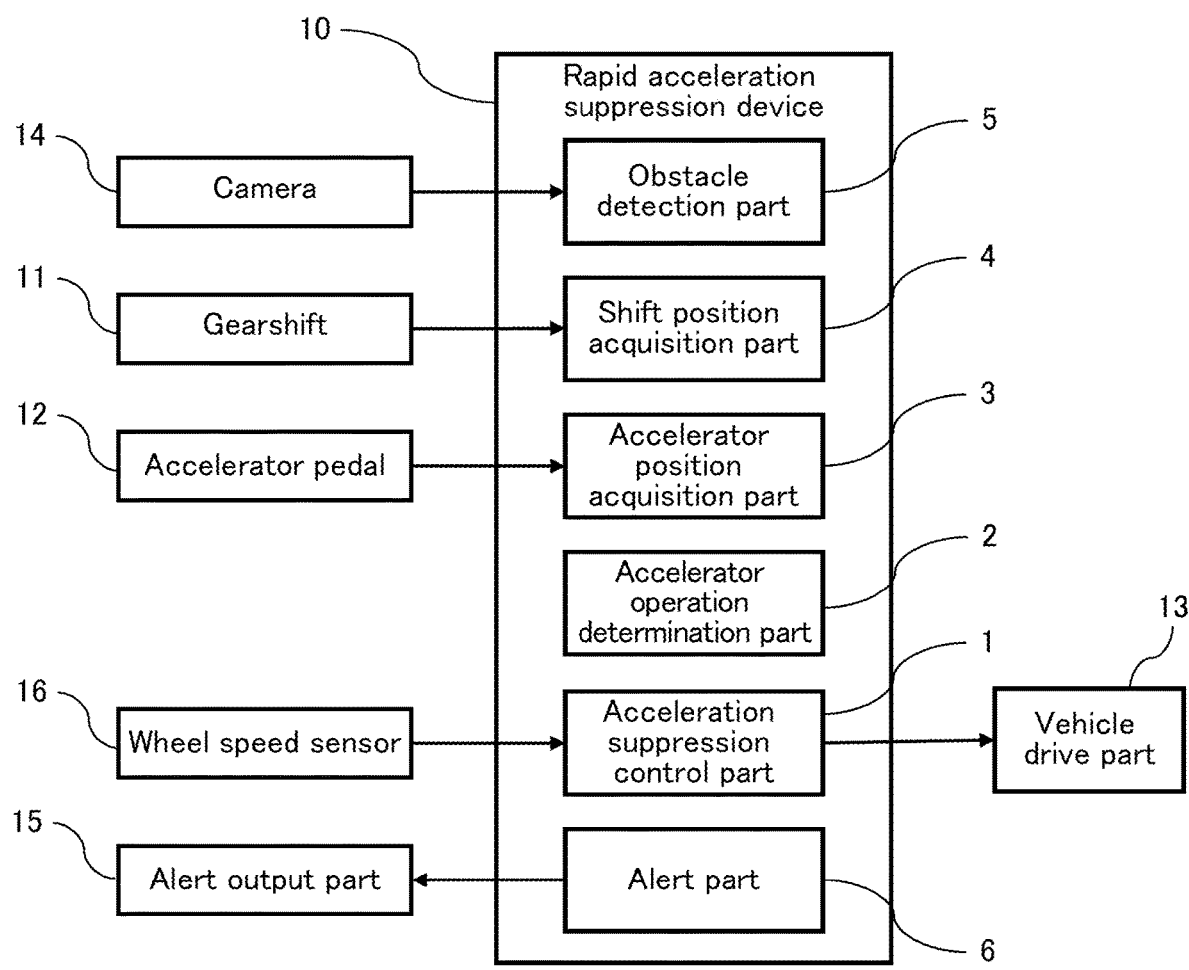
FIG. 1 is a system configuration diagram illustrating a structure of a rapid acceleration suppression device according to an embodiment of the present invention.

FIG. 1 is a system configuration diagram illustrating a structure of a rapid acceleration suppression device 10 according to the embodiment. The rapid acceleration suppression device 10 includes an acceleration suppression control part 1, an accelerator operation determination part 2, an accelerator position acquisition part 3, a shift position acquisition part 4, an obstacle detection part 5, and an alert part 6.

The shift position acquisition part 4 acquires a position of a gearshift 11 changed by a driver of a subject vehicle, such as "P" (Parking), "R" (Reverse), "N" (Neutral), and "D" (Drive). In the specification, a position of the gearshift 11 of "P" or "N" at which the vehicle is not moved (driven) is referred to as a non-drive range; and a position of the gearshift 11 of "R" or "D" at which the vehicle is moved (driven) is referred to as a drive range. Note that when the vehicle has a shift switch instead of the gearshift 11, the gearshift 11 is herein read as the shift switch.

The accelerator position acquisition part 3 acquires a depression amount of the accelerator pedal (which may also be abbreviated as "AP") 12 as an accelerator position. When a driver steps on the accelerator pedal 12 hard, the accelerator position acquisition part 3 acquires a large accelerator position.

The obstacle detection part 5 detects, from an image captured by the camera 14 which takes an image in front of the subject vehicle, whether or not there is an obstacle such as another vehicle which may collide therewith, and, if any, a distance between itself and the possible obstacle. The obstacle detection part 5 may detect an obstacle using a millimeter-wave radar, a LIDAR (light detection and ranging), or any other appropriate means.

The accelerator operation determination part 2 determines an operating state such as a rapid depression of the accelerator pedal 12 by the driver, based on a level and a temporal change of the accelerator position acquired by the accelerator position acquisition part 3.

The acceleration suppression control part 1 provides control over the vehicle drive part 13 such that, when a speed of the subject vehicle detected by the wheel speed sensor 16 is 0 (zero), that is, the vehicle is at a stop, the gearshift 11 is placed in the non-drive range, based on a position of the gearshift 11 acquired by the shift position acquisition part 4 and on an operating state of the accelerator pedal 12 determined by the accelerator operation determination part 2; and, when the accelerator pedal 12 is being stepped down (when a rotation rate of an engine is increasing), acceleration is suppressed (for example, a throttle position of the engine is restricted), while the vehicle keeps on stopping.

When the gearshift 11 is shifted to the drive range while the accelerator pedal 12 is stepped down, the acceleration suppression control part 1 provides control over the vehicle drive part 13 such that the vehicle travels at a speed as low as a creep run. Also, when the accelerator pedal 12 is kept on being stepped down, the acceleration suppression control part 1 provides control over the vehicle drive part 13 such that the vehicle accelerates with a limit of depression (acceleration up to a preset speed, for example, 30 km/h).

The creep run described above is a behavior unique to an AT (automatic transmission) vehicle which is equipped with a torque converter for transmitting a torque of an engine to a drive wheel. The creep run is, however, possible also in some other vehicles such as an engine vehicle without a torque converter and an electric vehicle without an engine. The above-described configuration can be thus applied to such a creep-run-available vehicle.

The acceleration suppression control part 1 also provides control over the vehicle drive part 13 such that, when the obstacle detection part 5 detects an obstacle after the vehicle starts moving, the vehicle decelerates or stops.

When the acceleration suppression control part 1 provides an acceleration suppression control over the vehicle drive part 13, the alert part 6 puts out an alert indicating an abnormal operation by the driver via an alert output part 15 such as an in-vehicle display. As another alert indicating the abnormal operation by the driver, the alert part 6 flashes a hazard lamp of the vehicle or the like via the alert output part 15.

The rapid acceleration suppression device 10 is realized by an ECU (Electronic Control Unit) including a CPU (Central Processing Unit), a ROM (Read only memory), a RAM (Random access memory), an electronic component, and an interface circuit. By executing a program stored in the ROM, the rapid acceleration suppression device 10 performs respective functions of the acceleration suppression control part 1 and the like.

The rapid acceleration suppression device 10 may be realized as a part of functions of an engine control ECU which provides control over the vehicle drive part 13.

Figure 2:
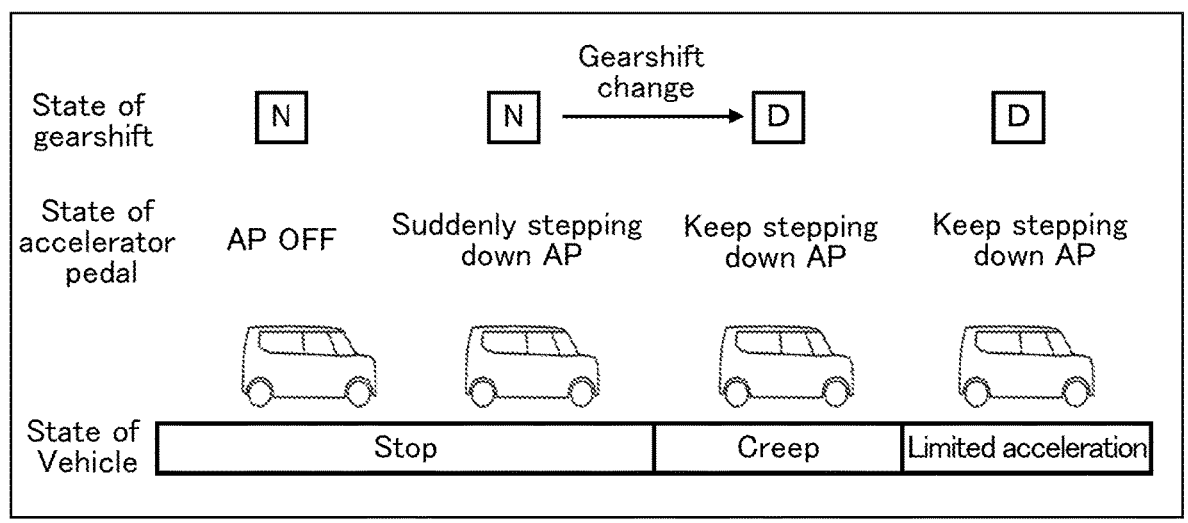
FIG. 2 is a diagram illustrating an example of operations performed by a vehicle equipped with the rapid acceleration suppression device.

Next are described operations of a vehicle equipped with the rapid acceleration suppression device 10 according to the embodiment, with reference to FIG. 2.

FIG. 2 illustrates how a state of the vehicle changes over time by operating the gearshift 11 (FIG. 1) and the accelerator pedal 12 (FIG. 1), as time elapses from left to right with respect to the plane of the figure.

When a gearshift state that shows a position of the gearshift 11 is "N" and an accelerator pedal state that shows an operating state of the accelerator pedal 12 is "AP OFF" (the accelerator pedal is off), the vehicle is in a state of stop.

When the gearshift state is "N" and the driver suddenly steps down on the accelerator pedal 12, the rapid acceleration suppression device 10 suppresses acceleration of a rotation rate of the engine. At this time, because the gearshift state is "N", the vehicle remains stopped.

When the state of gearshift is changed from "N" to "D" and the driver keeps stepping down on the accelerator pedal 12 (the state of accelerator pedal is at "Keep stepping down AP"), though driving force of the engine is transmitted to a drive wheel, the vehicle starts running at a speed as low as that of a creep run, for example, 10 km/h (the vehicle state is "Creep"), under control of the rapid acceleration suppression device 10.

When the driver further keeps stepping down the accelerator pedal 12 (the accelerator pedal state is at "Keep stepping down AP"), the vehicle enters into a state of limited acceleration under control of the rapid acceleration suppression device 10 and thus accelerates within an upper limit of a preset speed, for example, 30 km/h.

As described above, the vehicle equipped with the rapid acceleration suppression device 10 according to the embodiment can prevent a sudden acceleration because, even when the driver put the gearshift into the drive range in a state where the accelerator pedal is being stepped down while the non-drive range is selected, acceleration is suppressed keeping the non-drive range.

When the driver further continues to step down on the accelerator pedal, the vehicle travels at a low speed at first, and then, at a limited accelerated speed. This makes it possible to travel reflecting a driver's intention of starting the vehicle.

Figure 3:
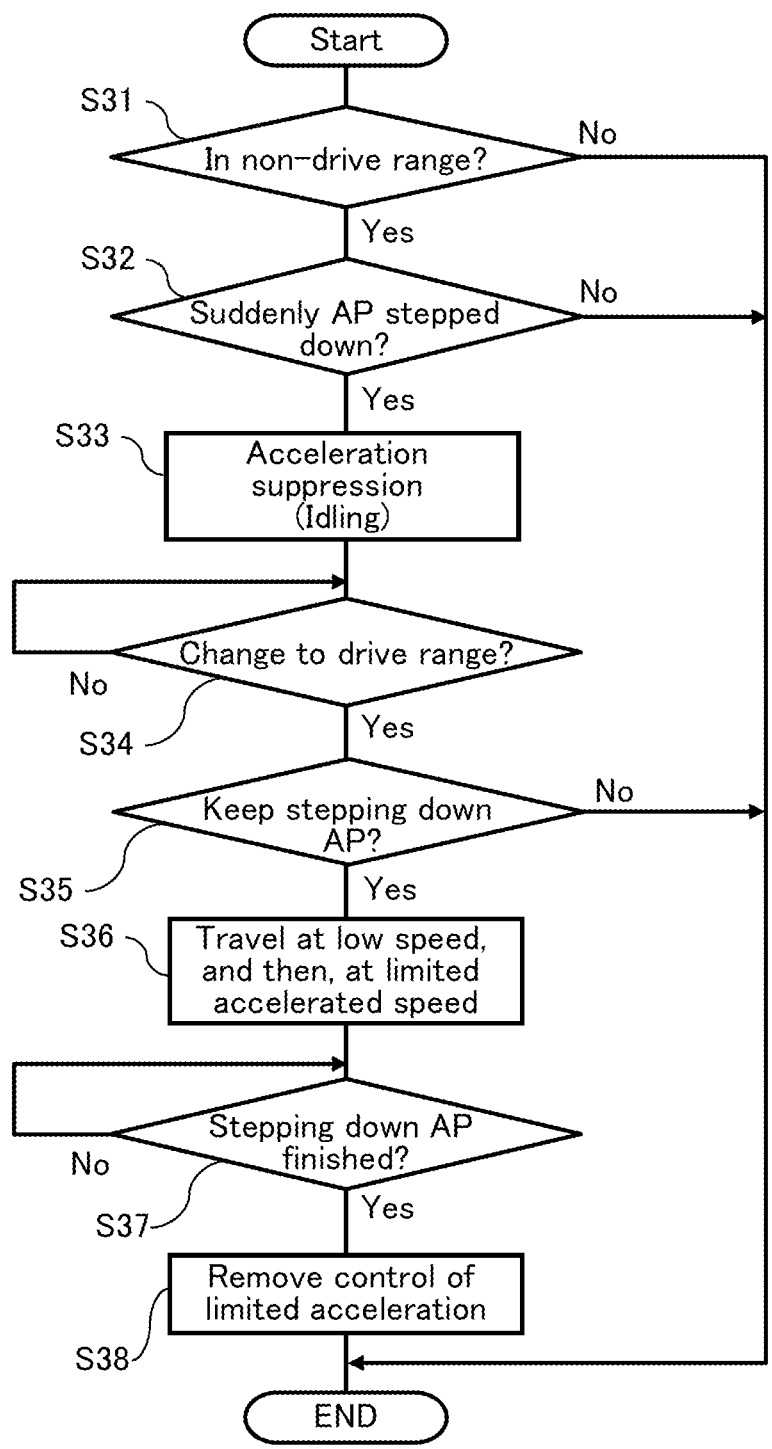
FIG. 3 is a flowchart for explaining control performed by the rapid acceleration suppression device.

Next is described a processing performed by the rapid acceleration suppression device 10 with reference to a flowchart of FIG. 3.

In step S31, the shift position acquisition part 4: acquires a position of the gearshift 11; and thereby determines whether or not the gearshift 11 is put in the non-drive range, namely, "P" or "N". When the gearshift 11 is not determined to be put in the non-drive range (No in S31), the processing terminates. When the gearshift 11 is determined to be put in the non-drive range (Yes in S31), the processing advances to step S32.

More specifically, in the following cases, the rapid acceleration suppression device 10 does not determine that the gearshift 11 is put in the non-drive range, and the processing terminates. Those cases include: when a speed of the vehicle is not lower than 30 km/h; when the vehicle is traveling on a sloping road with an upward gradient percentage of 7% or larger; when a turn signal is ON or when a prescribed number of seconds (for example, 2 seconds) has not yet passed after the turn signal is used; and when a brake operation is being performed or when a prescribed number of seconds (for example, 2 seconds) has not yet passed after the brake operation is performed.

In step S32, the accelerator position acquisition part 3 acquires an accelerator position of the accelerator pedal 12. The accelerator operation determination part 2 determines whether or not the accelerator pedal 12 has been suddenly depressed, based on on a level and a temporal change of the accelerator position acquired by the accelerator position acquisition part 3. When the accelerator pedal 12 is not determined to have been suddenly depressed (No in S32), the processing terminates. When the accelerator pedal 12 is determined to have been suddenly depressed (Yes in S32), the processing advances to step S33.

More specifically, the accelerator operation determination part 2 determines that the accelerator pedal 12 has been suddenly stepped down when the accelerator position is at a level of 90% or higher, and, at the same time, the accelerator pedal 12 has been depressed at a speed about three times as rapid as normal.

In step S33, the acceleration suppression control part 1 provides control over the vehicle drive part 13 such that an acceleration suppression is performed, in which a limit is placed when a driver intends to make an engine throttle opening large. That is, the acceleration suppression control part 1 suppresses acceleration of a rotation rate of the engine at idling, independently of the accelerator position acquired by the accelerator position acquisition part 3.

When the engine is in an idling stop state, the acceleration suppression control part 1 provides control over the vehicle drive part 13 such that the engine restart to enter an idling state.

In step S34, the acceleration suppression control part 1 determines whether or not the position of the gearshift 11 acquired by the shift position acquisition part 4 has shifted from the non-drive range to the drive range (for example "D" or "R"). If the position is determined to have shifted to the drive range (Yes in S34), the processing advances to step S35. If the position is determined to remain unchanged in the non-drive range (if the position is not determined to have shifted to the drive range), the processing stands by for a shift to the drive range (No in S34).

In step S35, the acceleration suppression control part 1 determines, via the accelerator operation determination part 2, whether or not the accelerator pedal 12 is in the state of "Keep stepping down AP". If the accelerator pedal 12 is determined to be released (No in S35), the processing terminates. If the state of "Keep stepping down AP" is determined to be continued (Yes in S35), the processing advances to step S36.

In step S36, the acceleration suppression control part 1 provides control over the vehicle drive part 13 such that the vehicle starts running at a low speed. The acceleration suppression control part 1 then provides control over the vehicle drive part 13 such that the vehicle travels at the low speed for a prescribed time period (for example, 5 seconds) and, after that, at a limited accelerated speed (for example, within an upper limit of 30 km/h).

In step S37, the acceleration suppression control part 1 determines, via the accelerator operation determination part 2, whether or not the accelerator pedal 12 is not depressed anymore ("Keep stepping down AP" is finished). If "Keep stepping down AP" is determined to have been finished (Yes in S37), the processing advances to step S38. If "Keep stepping down AP" is not determined to have been finished (No in S37), the processing stands by for completion of the step down of the accelerator pedal 12.

More specifically, the acceleration suppression control part 1 determines that "Keep stepping down AP" has already been finished, when the accelerator position is at a level not higher than a prescribed value (for example, not higher than 50%).

In step S38, the acceleration suppression control part 1: removes the control of the limited acceleration over the vehicle drive part 13; and, instead, provides control over the vehicle drive part 13 such that the vehicle drive part 13 controls the vehicle in accordance with the accelerator position.

As described above, the rapid acceleration suppression device 10 according to the embodiment includes: the shift position acquisition part 4 configured to acquire an operation position of the gearshift 11; the accelerator position acquisition part 3 configured to acquire a depression amount of the accelerator pedal 12 as an accelerator position; the accelerator operation determination part 2 configured to determine an operating state of the accelerator pedal 12 based on a level and a temporal change of the accelerator position; and the acceleration suppression control part 1 configured to provide control over the vehicle drive part 13 such that acceleration is suppressed, when a position of the gearshift 11 acquired by the shift position acquisition part 4 is in the non-drive range and also when the accelerator operation determination part 2 determines that the accelerator pedal 12 has been suddenly depressed, and also such that the vehicle travels at a low speed at first, and, after that, at a limited accelerated speed within a prescribed upper limit, when the position of the gearshift 11 is changed from non-drive range to the drive range while the accelerator pedal 12 is kept on being depressed.

The above-described configuration makes it possible to prevent a sudden acceleration, even when a driver put the gearshift into the drive range in a state where the accelerator pedal is being stepped down while the non-drive range is selected, because acceleration has already been suppressed in the state of the non-drive range. Also, when the driver further continues to depress the accelerator pedal for a prescribed time period or longer, the vehicle is controlled to travel at a low speed after it starts, and then, at a limited accelerated speed. The vehicle can thus travel reflecting a driver's intention of "starting/accelerating" with limitation, thus allowing user-friendliness to be improved.

Figure 4:
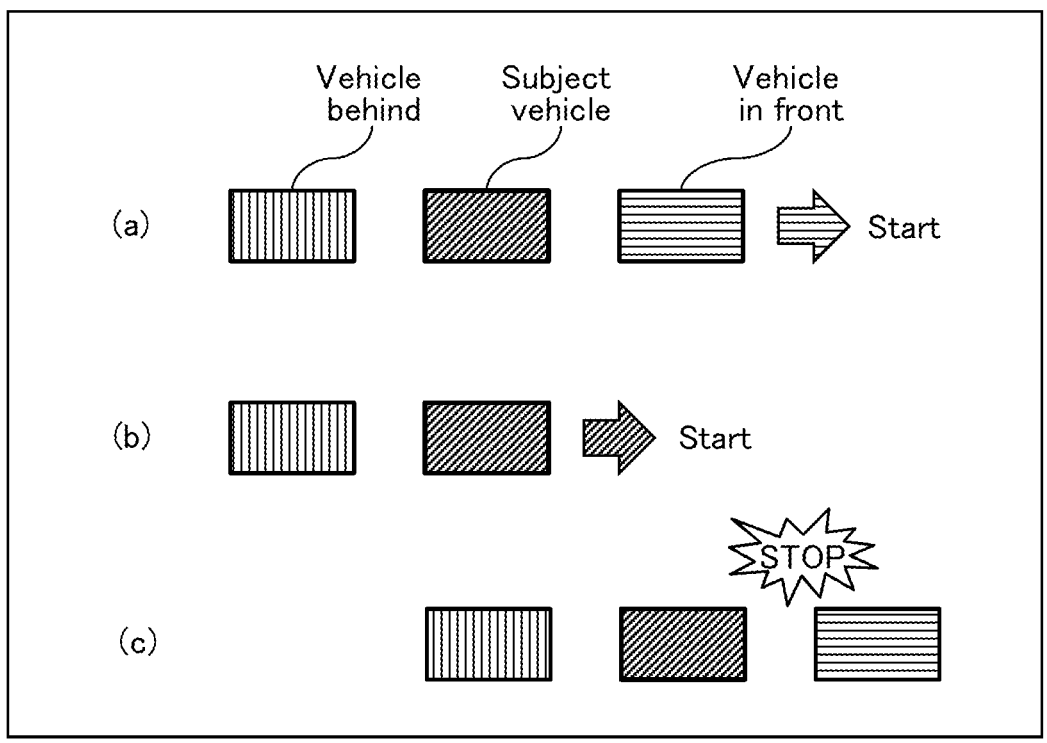
FIG. 4 is a diagram illustrating an example of another operations performed by the vehicle equipped with the rapid acceleration suppression device.

Next are described another operations performed by the vehicle equipped with the rapid acceleration suppression device 10 according to the embodiment, with reference to FIG. 4.

FIG. 4 illustrates the vehicle equipped with the rapid acceleration suppression device 10 according to the embodiment (which may also be referred to as a subject vehicle hereinafter) in a state where the subject vehicle is waiting at a traffic light between vehicles in front of and behind itself or where the subject vehicle is stopped due to a traffic jam. Note that in FIG. 4, a rightward direction with respect to the plane of the figure is a traveling direction of the vehicle.

In FIG. 4, (a) is a state where a vehicle in front of the subject vehicle has started.

In FIG. 4, as illustrated in a state of (b), in response to the start of the vehicle in front, a driver of the subject vehicle operates the gearshift 11 and the accelerator pedal 12 with an intention of starting the vehicle itself.

At this time, let us assume a case where the driver suddenly steps down on the accelerator pedal 12 while keeping the position of the gearshift 11 in "N" and change the position of the gearshift 11 into "D" while continuing to depress the accelerator pedal. Even in that case, the vehicle will not make a sudden start, because the rapid acceleration suppression device 10 provides control over the vehicle drive part 13 such that the vehicle travels at a low speed after it starts, and then, at a limited accelerated speed.

In FIG. 4, a state of (c) illustrates that, when the subject vehicle catches up a vehicle in front (when a distance between the subject vehicle and the vehicle in front is equal to or smaller than a prescribed value) the rapid acceleration suppression device 10 provides control over the vehicle drive part 13 such that the subject vehicle slows down or stops.

In FIG. 4, a state of (b) illustrates that, when the vehicle starts under the acceleration suppression control by the rapid acceleration suppression device 10, the rapid acceleration suppression device 10: activates an in-vehicle alarm to the driver; and notifies the driver that the vehicle has not been handled appropriately, such as a sudden depression of the accelerator pedal with the position of the gearshift 11 in the non-drive range.

Additionally, the rapid acceleration suppression device 10 gives an emergency stop signal by flashing a hazard lamp at a speed different from that at normal times, to thereby notify a vehicle nearby (for example, a vehicle behind) that the subject vehicle is travelling with an inappropriate handling.

The configuration described above makes it possible to facilitate a safe traveling of the subject vehicle and other vehicles, thus allowing convenience of drivers of the vehicles to be improved.

Figure 5:
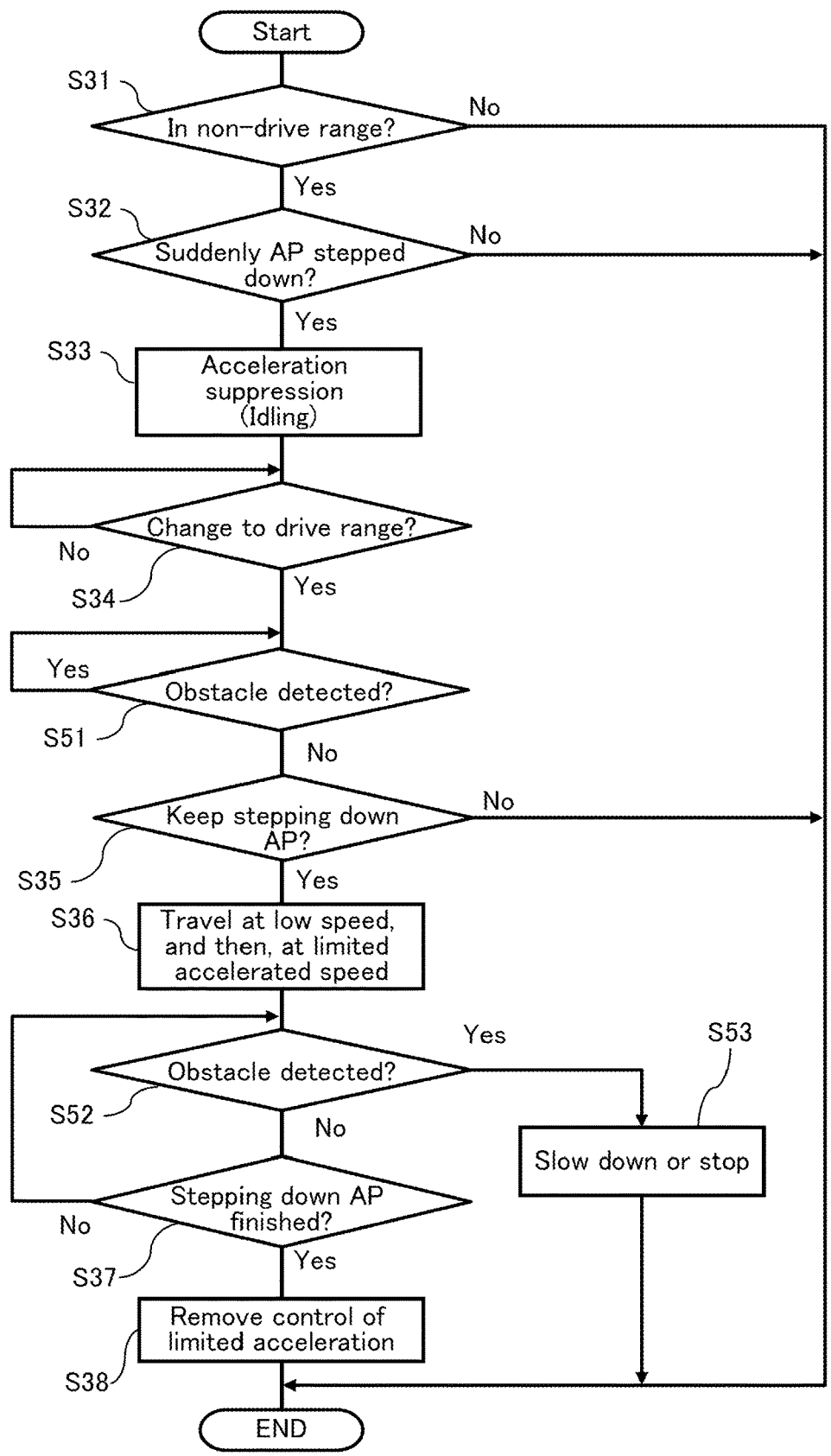
FIG. 5 is a flowchart for explaining another control performed by the rapid acceleration suppression device.

FIG. 5 is a flowchart of the processing in which the rapid acceleration suppression device 10 controls operations of the subject vehicle as explained with reference to FIG. 4. The flowchart of FIG. 5 includes step S51, step S52, and step S53, in addition to the flowchart of the processing performed by the rapid acceleration suppression device 10 as explained with reference to FIG. 3.

Step S31 to step S38 of FIG. 5 are the same as those of FIG. 3 and description thereof is thus omitted.

In step S51, the acceleration suppression control part 1 determines, via the obstacle detection part 5, whether or not an obstacle has been detected from an image captured by the camera 14 which takes an image ahead of the subject vehicle. The obstacle herein includes another vehicle which may rear-end or collide with the subject vehicle. If an obstacle is not determined to have been detected (No in S51), the processing advances to step S35. If an obstacle is determined to have been detected, the processing stands by until no obstacle is determined to have been detected.

More specifically, the acceleration suppression control part 1 determines that an obstacle has been detected, when a distance between the obstacle and the subject vehicle itself detected by the obstacle detection part 5 is equal to or smaller than a prescribed value (when the subject vehicle is close to the obstacle). The acceleration suppression control part 1 does not determine that an obstacle has been detected, when the distance is larger than the prescribed value (when the subject vehicle is away from the obstacle) or when the obstacle detection part 5 has not detected any obstacle.

In step S35, if the acceleration suppression control part 1 determines that the accelerator pedal is kept on being depressed, then, in step S36, the acceleration suppression control part 1 provides control over the vehicle drive part 13 such that the vehicle travels at a low speed, and, after that, at a limited accelerated speed. Therefore, in step S51, while the acceleration suppression control part 1 determines that an obstacle has been detected, the vehicle will not start. This makes it possible for the vehicle to travel safely depending on situations, thus allowing convenience of the driver to be improved.

In step S52, the acceleration suppression control part 1 determines whether or not obstacle detection part 5 has detected an obstacle when the vehicle is traveling at the limited accelerated speed after at the low speed in step S36. If an obstacle is not determined to have been detected (No in S52), the processing advances to step S37. If an obstacle is determined to have been detected (No in S52), the processing advances to step S53.

In step S53, the acceleration suppression control part 1 provides control over the vehicle drive part 13 such that the vehicle slows down or stop so as to prevent collision, and the processing terminates.

As described above, when an obstacle has been detected while the vehicle is traveling at a speed of a limited acceleration, the limited acceleration is terminated and the vehicle slows down or stops. This makes it possible for the vehicle to travel safely depending on situations, thus allowing convenience of a driver of the vehicle to be improved.

If the acceleration suppression control part 1 detects an obstacle from when, in step S36, the acceleration suppression control part 1 provides control over the vehicle drive part 13 such that the vehicle travels at a low speed at first, and then, at a limited accelerated speed, until when, in step S38, the control of the limited acceleration is removed, that is, during a period during which the vehicle is traveling at the low speed and at the limited accelerated speed, then the vehicle slows down or stops. The configuration makes it possible for the vehicle to prevent or reduce collision with the obstacle.

In step S53, instead of the control of slowing down or stopping the vehicle, the acceleration suppression control part 1 may provide control over the vehicle drive part 13 such that a collision damping brake function works.

Though not illustrated in FIG. 5, in parallel to performing step S33 to step S38 or step S53, the rapid acceleration suppression device 10 may output an alert via the alert part 6 to the alert output part 15, to thereby alert the driver and a vehicle nearby as described with reference to FIG. 4.

The present invention is not limited to the aforementioned embodiments and various design changes can be made without departing from the gist of the present invention.

DESCRIPTION OF REFERENCE NUMERALS 1 acceleration suppression control part
2 accelerator operation determination part
3 accelerator position acquisition part
4 shift position acquisition part
5 obstacle detection part
6 alert part
10 rapid acceleration suppression device
11 gearshift
12 accelerator pedal
13 vehicle drive part
14 camera
15 alert output part
16 wheel speed sensor

The invention claimed is:

1. A rapid acceleration suppression device that suppresses a rapid acceleration of a vehicle, comprising:
a shift position acquisition part configured to acquire an operation position of a gearshift;
an accelerator position acquisition part configured to acquire a depression amount of an accelerator pedal as an accelerator position;
an accelerator operation determination part configured to determine an operating state of the accelerator pedal, based on a level and a temporal change of the accelerator position; and
an acceleration suppression control part configured to provide control over a vehicle drive part, (i) such that the vehicle is kept stopped without acceleration of the vehicle drive part, while the vehicle is stopped and the position of the gearshift acquired by the shift position acquisition part is in a non-drive range and also when the accelerator operation determination part determines that the accelerator pedal has been suddenly depressed, and (ii) such that the vehicle travels at a low speed at first, and then, at an accelerated speed within a prescribed upper speed limit, when the position of the gearshift is changed from the non-drive range to a drive range, while the accelerator pedal is kept on being depressed.

2. The rapid acceleration suppression device according to claim 1,
further comprising an obstacle detection part configured to detect an obstacle in a traveling direction of the vehicle,
wherein the acceleration suppression control part is configured to provide control over the vehicle drive part: such that the vehicle will not start to travel, when the obstacle detection part has detected the obstacle in the traveling direction of the vehicle, while the vehicle is stopped and the accelerator pedal is kept on being depressed, and even when the position of the gearshift is changed from the non-drive range to the drive range; or, such that the vehicle slows down or stops, when the vehicle is controlled to travel at the low speed, and then, at the accelerated speed within the prescribed upper speed limit and when the obstacle detection part has detected the obstacle in the traveling direction of the vehicle.

3. The rapid acceleration suppression device according to claim 2,
further comprising an alert part configured to output an alert indicating abnormal operations of the gearshift and the accelerator pedal to an alert output part,
wherein the alert part is configured to output the alert, when the acceleration suppression control part provides control over the vehicle drive part such that the vehicle is kept stopped without acceleration of the vehicle drive part or such that the vehicle travels at the low speed, and then, at the accelerated speed within the prescribed upper speed limit.

4. The rapid acceleration suppression device according to claim 1,
further comprising an alert part configured to output an alert indicating abnormal operations of the gearshift and the accelerator pedal to an alert output part,
wherein the alert part is configured to output the alert, when the acceleration suppression control part provides control over the vehicle drive part such that the vehicle is kept stopped without acceleration of the vehicle drive part or such that the vehicle travels at the low speed, and then, at the accelerated speed within the prescribed upper speed limit.

5. A rapid acceleration suppression control method of a vehicle, comprising:
providing control over a vehicle drive part to keep the vehicle stopped without acceleration of the vehicle drive part, when the vehicle is stopped and an accelerator pedal has been suddenly depressed and also an operation position of a gearshift is in a non-drive range; and
providing control over the vehicle drive part for the vehicle to travel at a low speed at first, and then, at an accelerated speed within a prescribed upper speed limit, when the position of the gearshift is changed from the non-drive range to a drive range, while the accelerator pedal is kept on being depressed.

6. The rapid acceleration suppression control method according to claim 5,
wherein, in the step of providing control over the vehicle drive part to be accelerated for the vehicle to travel at the low speed at first, and then, at the accelerated speed within the prescribed upper speed limit, when an obstacle has been detected in a traveling direction of the vehicle, while the accelerator pedal is kept on being depressed while the vehicle is stopped, and even when the position of the gearshift is changed from the non-drive range to the drive range, providing control over the vehicle drive part for the vehicle to be kept stopped and to not to start to travel.

7. The rapid acceleration suppression control method according to claim 6,
wherein, in the step of providing control over the vehicle drive part for the vehicle to be kept stopped without acceleration of the vehicle drive part or in the step of providing control over the vehicle drive part to be accelerated for the vehicle to travel at the low speed at first, and then, at the accelerated speed within the prescribed upper speed limit, an alert indicating abnormal operations of the gearshift and the accelerator pedal is displayed.

8. The rapid acceleration suppression control method according to claim 5,
wherein, in the step of providing control over the vehicle drive part to be accelerated for the vehicle to travel at the low speed at first, and then, at the accelerated speed within the prescribed upper speed limit, when an obstacle has been detected in a traveling direction of the vehicle, providing control over the vehicle drive part to slow down or stop the vehicle.

9. The rapid acceleration suppression control method according to claim 8,
wherein, when the obstacle is determined to have been detected in the traveling direction of the vehicle, based on a prescribed distance between the vehicle and the obstacle in the traveling direction, providing control over the vehicle drive part to slow down or stop the vehicle.

10. The rapid acceleration suppression control method according to claim 9,
wherein, in the step of providing control over the vehicle drive part for the vehicle to be kept stopped without acceleration of the vehicle drive part or in the step of providing control over the vehicle drive part to be accelerated for the vehicle to travel at the low speed at first, and then, at the accelerated speed within the prescribed upper speed limit, an alert indicating abnormal operations of the gearshift and the accelerator pedal is displayed.

11. The rapid acceleration suppression control method according to claim 8,
wherein, in the step of providing control over the vehicle drive part for the vehicle to be kept stopped without acceleration of the vehicle drive part or in the step of providing control over the vehicle drive part to be accelerated for the vehicle to travel at the low speed at first, and then, at the accelerated speed within the prescribed upper speed limit, an alert indicating abnormal operations of the gearshift and the accelerator pedal is displayed.

12. The rapid acceleration suppression control method according to claim 5,
wherein, in the step of providing control over the vehicle drive part for the vehicle to be kept stopped without acceleration of the vehicle drive part or in the step of providing control over the vehicle drive part to be accelerated for the vehicle to travel at the low speed at first, and then, at the accelerated speed within the prescribed upper speed limit, an alert indicating abnormal operations of the gearshift and the accelerator pedal is displayed.

\* \* \* \* \*